(No Model.) 2 Sheets—Sheet 1.
C. M. FRENCH.
POTATO DIGGER.
No. 375,484. Patented Dec. 27, 1887.
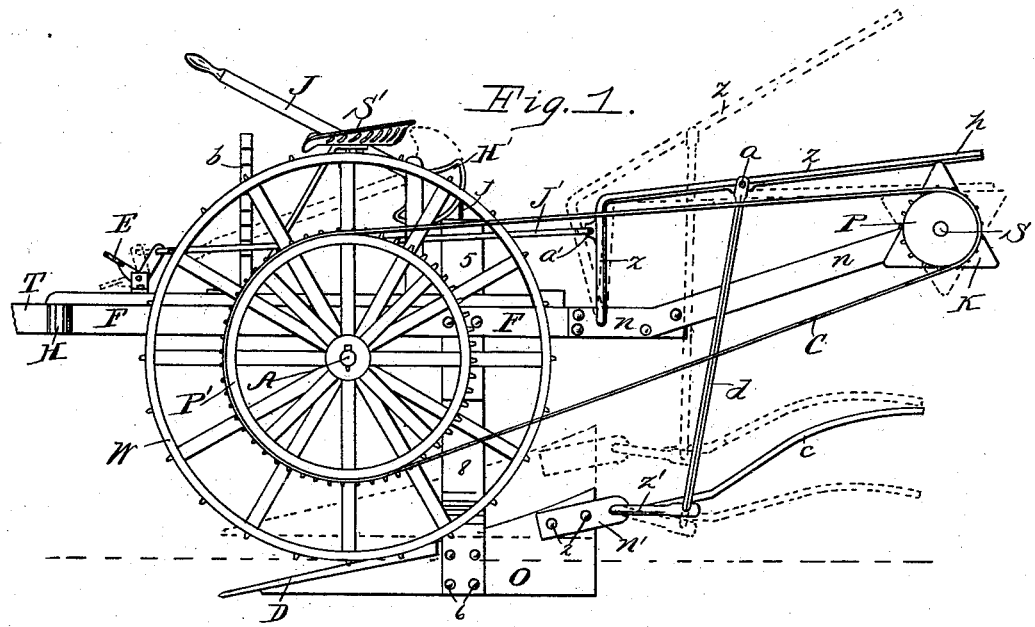
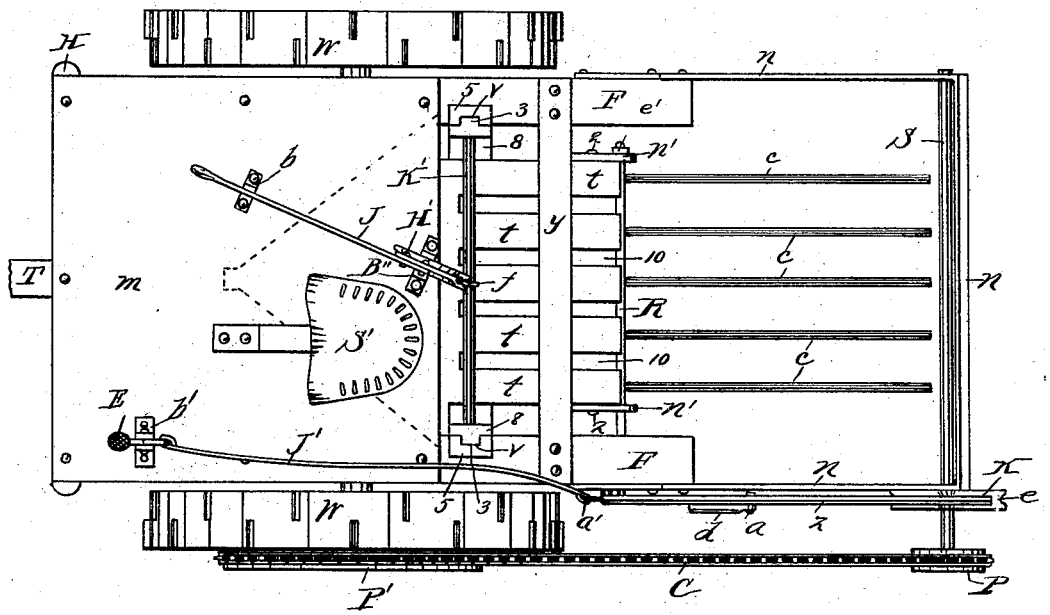
ATTEST:
C. W. Russell.
B. F. Wheeler
INVENTOR.
C. M. French
By Roscoe B. Wheeler
atty (No Model.)  2 Sheets—Sheet 2.

C. M. FRENCH.
POTATO DIGGER.

No. 375,484.  Patented Dec. 27, 1887.

ATTEST.
C W Russell
B F Wheeler

INVENTOR.
C. M. French
By Roscoe B Wheeler
atty

N. PETERS, Photo-Lithographer, Washington, D. C.

UNITED STATES PATENT OFFICE.

CARMI M. FRENCH, OF WATERFORD, MICHIGAN.

POTATO-DIGGER.

SPECIFICATION forming part of Letters Patent No. 375,484, dated December 27, 1887.

Application filed April 26, 1887. Serial No. 236,242. (No model.)

*To all whom it may concern:*

Be it known that I, CARMI M. FRENCH, a citizen of the United States, residing at Waterford, in the county of Oakland and State of Michigan, have invented certain new and useful Improvements in Potato-Diggers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention in potato-diggers relates to that class having transporting-wheels, which, when the machine is in operation, travels over the ground, carrying the frame-work over the row of potatoes being dug, and has a plow suspended from the frame, which raises the soil and potatoes, dropping them onto a shaking rake which separates the potatoes from the soil, leaving them on the surface of the ground.

The object of my invention is to construct a machine that will successfully separate the potatoes from the soil as fast as the machine is drawn by a team, and not have the machine work too hard or become clogged by the vines of the potatoes or foul matter; and my invention consists in the organization of parts, as hereinafter set forth, and pointed out particularly in the claims.

Figure 3:
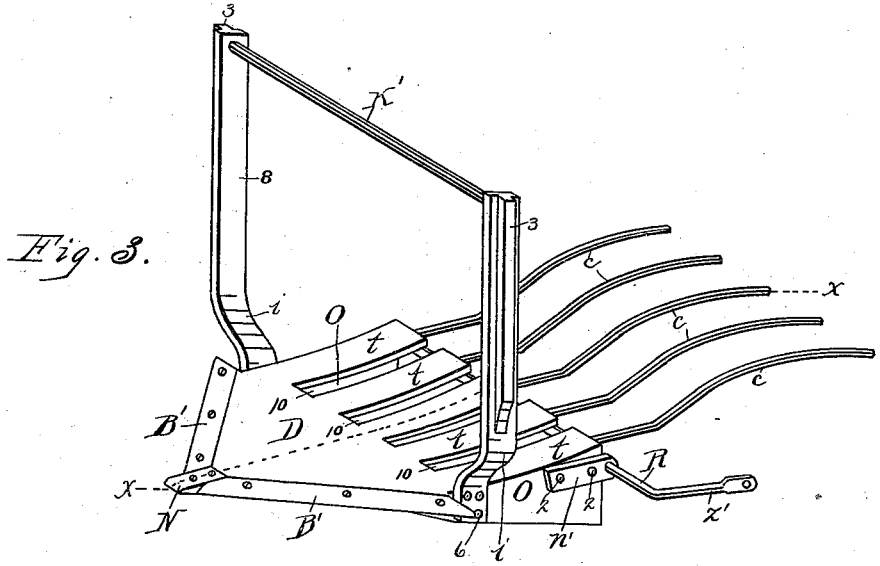
Figure 4:
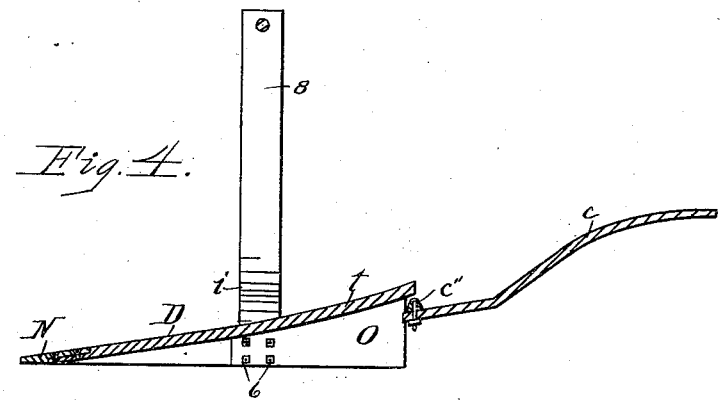
Figure 5:
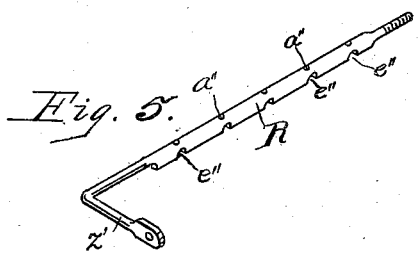

The invention is illustrated by two sheets of drawings, in which Figure 1 is a side elevation of my improved machine. Fig. 2 is a top plan of same. Fig. 3 is a perspective of the plow, showing the rake attached thereto. Fig. 4 is a front elevation, in section, of Fig. 3, taken on dotted line *x x* of said view. Fig. 5 is a perspective of the rake-head.

In the drawings, W W represent the traction or transporting wheels, which are attached to the axle A, and F F are the side bars of the frame, to which the axle is attached.

H is the front bar, to which the tongue T is attached.

Y is the rear cross-bar.

*m* is the platform.

S' is the driver's seat.

5 5 represent the vertical slideways, which are bolted to the inner faces of the sides of the frame back of the axle, and are provided on their facing sides with channels V V. (See Fig. 2.)

8 8 show the sliding arms, which are provided on their outer faces with lips or projections 3 3. (See Figs. 2 and 3.) Said lips fill the channels V V of the slideways. The upper ends of the sliding arms are attached to the rod K'. The sliding arms at *i* are bent inward and their lower ends are bolted to the landsides O O of the plow D, as shown in Fig. 3. The bend *i* in the sliding arms is to provide a wide passage for the potato-tops, to prevent them from hanging to the arms or clogging the machine.

The front of the plow is V-shaped, and along the cutting-edges I bolt the steel cutters or blades B' B', and N is a steel nose secured over the center of the front of the plow, and said parts may be detached for repairs. The top of the plow is flat and is inclined. Its rear end is provided with a series of fingers or blades, *t*, having spaces 10 between them. Said spaces are not so wide as to allow potatoes to fall through them as the plow passes through the soil.

To the landsides O, I attach the supporting-arms *n'* by means of bolts 2. In said arms I journal the rake-head R, having a nut, *e'*, at one end, and the arm Z', formed at right angles, on the other end. Said rake-head I locate below and in the rear of the fingers *t*. (See Figs. 2 and 3.) The under face of the rake-head is provided with a series of recesses, $e''$, crossing it, and with a series of holes, $a''$, passing vertically through the rake-head, registering with the recesses. (See Fig. 5.)

*c* represents a series of round steel rods, which are slightly arched. A hole is formed through one end of each rod, and said end is placed in a recess, *e'*, of the rake-head, and a rivet or bolt, $c''$, is passed through the rake-head and rod, whereby they are firmly attached to the rake-head.

*n n n* represent a metal frame, which is attached to the side bars, F F, of the frame, and extends rearwardly at a slight elevation to the main frame.

S is a shaft journaled in the metal frame, carrying a sprocket-wheel, P, on one end.

K is a three-cornered or equilateral triangular disk, made fast to said shaft, having the recessed bearings e in the projections of said disk or cam.

Z is an L-shaped or angular bar, having one end pivotally attached to one of the sides n of the metal frame. Its free end h engages with and lies in the channels c of the cam K. (See Figs. 1 and 2.)

d is a rod, which I pivotally connect at a to the bar Z. The lower end of said rod is pivotally attached to the end of the arm Z' of the rake-head.

J is a draft-rod, one end of which I attach at a' to the bar Z. The other end is attached to the elbow-iron E, mounted on the platform m. Said elbow-iron is pivoted to the bracket b'.

P' is a sprocket-wheel made fast to one of the supporting-wheels, and C is a chain passing over said sprocket-wheel and the sprocket-wheel P, mounted on the shaft S.

J is a lever for raising and lowering the plow. It is pivoted to the upright B'', and has a circular head, H', at the lower end, which receives the chain f. One end of the chain is attached to the head of the lever, and the other end to the rod K' of the plow.

b is a toothed bar which I attach to the platform, and when the lever J is thrown down to the dotted position of Fig. 1 the teeth of the bar engage with the lever and prevent it from rising, thereby holding the plow D elevated, as shown by dotted lines of Fig. 1. Said position shows the plow when turning the machine around and when traveling from place to place.

The upper dotted position of the rake in Fig. 1 shows the highest point. This is accomplished by pressing the elbow-iron E down to the dotted position shown in said figure, the operator simply placing his foot thereon.

It will be observed from the foregoing construction that the operations of the machine are as follows: To allow the plow D to enter the soil, the lever J is raised to lower it, and when the plow is running sufficiently deep the lever is locked to the bar b, and as the machine advances the sprocket-wheel P' revolves the chain C, turning the sprocket-wheel P, revolving the shaft S, thereby causing the triangular cam-wheel K to revolve, whereby the free end h of the bar Z is caused to rise and fall as it drops into the recesses e in the projecting points of the cam K, and as said bar is coupled to the arm Z' of the rake said rake is caused to rise and fall, and as the plow is advanced the soil containing the potatoes is dropped over the rear ends of the fingers t of the plow onto the rods c of the rake.

The rising and falling of the rake fingers or rods c cause the earth to become pulverized and the potatoes to be brought to the surface.

Having thus fully set forth my invention, what I claim as new, and desire to cover by Letters Patent, is—

1. In a potato-digger, the combination of the frame, the transporting-wheels, the slotted uprights attached to the frame, the plow having the tongued uprights S attached thereto and adapted to have vertical movement in the slotted uprights, said plow having also the series of fingers t at the rear end, the rake-head having the series of rods c attached pivotally to the rear end of said plow, and mechanism for raising and lowering said plow, as and for the purposes specified.

2. In a potato-digger, the combination of the frame and transporting-wheels, the plow D, having the curved uprights S attached to said frame, as set forth, and having the inclined fingers t, the landsides O O, the rake attached pivotally to the rear end of the plow, the frame n, the shaft attached thereto, and having the sprocket-wheel and triangular cam made fast thereto, the bar Z, having one end pivoted to the machine and at the other end adapted to engage with the triangular cam, the rod d, attached at one end to the bar Z and at the other to the arm of the rake-head, the sprocket-wheel mounted on the drive-wheel, and chain C, as and for the purposes set forth.

3. In combination, the wheels W W, the frame mounted thereon, the shaft S, attached to the rear end of the frame, and having the wheel P and cam K attached thereto, the mechanism for driving the wheel P, the plow D, attached to the frame and adapted to be raised and lowered, the rake-head pivoted to the rear end of said plow, the curved rods attached to the rake-head, the angular bar Z, the rod d, and the rod J', having one end coupled to the bar Z and the other to the elbow-iron E, substantially as specified.

4. In a potato-digger, the combination of the transporting-wheels, the frame mounted thereon, the plow D, located below the frame and adapted to be raised and lowered, said plow having the fingers t and landsides O formed integral, with detachable nose and cutting-plates, and the rake pivoted to the rear end of said plow and adapted to have vertical movement, substantially as and for the purposes set forth.

In testimony whereof I affix my signature in presence of two witnesses.

CARMI M. FRENCH.

Witnesses:
GEORGE ROBERTSON,
MORRISON BEARDSLEE.